(12) United States Patent
Mao et al.

(10) Patent No.: US 9,690,965 B2
(45) Date of Patent: Jun. 27, 2017

(54) SCANNER WITH REPLACEABLE BEZEL AND DESICCANT CARTRIDGE

(71) Applicant: SYMBOL TECHNOLOGIES, LLC, Lincolnshire, IL (US)

(72) Inventors: Yanmin Mao, Brampton (CA); Iheng Tsai, Taipei (TW); Zhiming Zhang, Richmond Hill (CA); Konstantinos D. Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/947,604

(22) Filed: Nov. 20, 2015

(65) Prior Publication Data
US 2017/0147845 A1    May 25, 2017

(51) Int. Cl.
*G06K 7/10* (2006.01)
(52) U.S. Cl.
CPC .................... *G06K 7/10881* (2013.01)
(58) Field of Classification Search
None
See application file for complete search history.

(56) References Cited

U.S. PATENT DOCUMENTS

2013/0252043 A1* 9/2013 Allison ............... H01M 2/1077
429/72
2013/0256405 A1* 10/2013 Montout .............. G06K 7/1091
235/375

OTHER PUBLICATIONS

RS309 Scanner Quick Reference Guide, 2007, Entire Document; pp. 7-8; http://www.datexcorp.com/wp-content/uploads/2012/12/Motorola-RS309-quick-start-guide.pdf.*

* cited by examiner

*Primary Examiner* — Kristy A Haupt

(57) ABSTRACT

Disclosed herein are embodiments of a scanner with a replaceable bezel and desiccant cartridge. One embodiment takes the form of a scanner that includes a device housing. The scanner also includes a data-acquisition module within the device housing. The scanner also includes a detachable rear bezel affixed to the device housing. The scanner also includes a desiccant cartridge removably attached to the interior wall of the detachable rear bezel.

18 Claims, 15 Drawing Sheets

SCANNER WITH REPLACEABLE BEZEL AND DESICCANT CARTRIDGE

BACKGROUND OF THE INVENTION

When an ingress protection ("IP") sealed enclosure rapidly transitions from a warm humid environment to a cold, low humidity environment, the moisture in the air volume within the enclosure will condense on the inside surfaces of the enclosure, as these surfaces rapidly cool. This causes problems for a handheld computer used in such situations, which includes windows which need to be free from condensation for a scanner, imager, camera or display to be useable. While this problem has been solved in the past by the use of desiccant packs within the housing, which are used to remove the moisture from the internal air volume, therefore reducing the amount of moisture available to condense on the windows, there are numerous problems with such desiccant packs. Even an IP sealed housing exchanges a small amount of air with the ambient environment by a number of means, which will introduce more moisture into the internal volume, eventually saturating the desiccant pack. This is often detected by the windows in the housing starting to "fog up" when the handheld transitions from warm to cold environments, which is inconvenient and can lead to failures of the device in the field. While humidity detectors can be used to detect saturated desiccant packs, this can lead to significant product bill of material ("BOM") cost and complexity increases in design and manufacturing for the handheld. Typically, once the desiccant pack is saturated, the handheld needs to be serviced in order to replace the desiccant pack, which means that the handheld needs to be taken out of service. Also, careful handling of the replacement desiccant pack is required during the service procedure: if the desiccant pack is exposed to the ambient environment for too long, its useful life may be significantly reduced as it absorbs moisture from the ambient environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
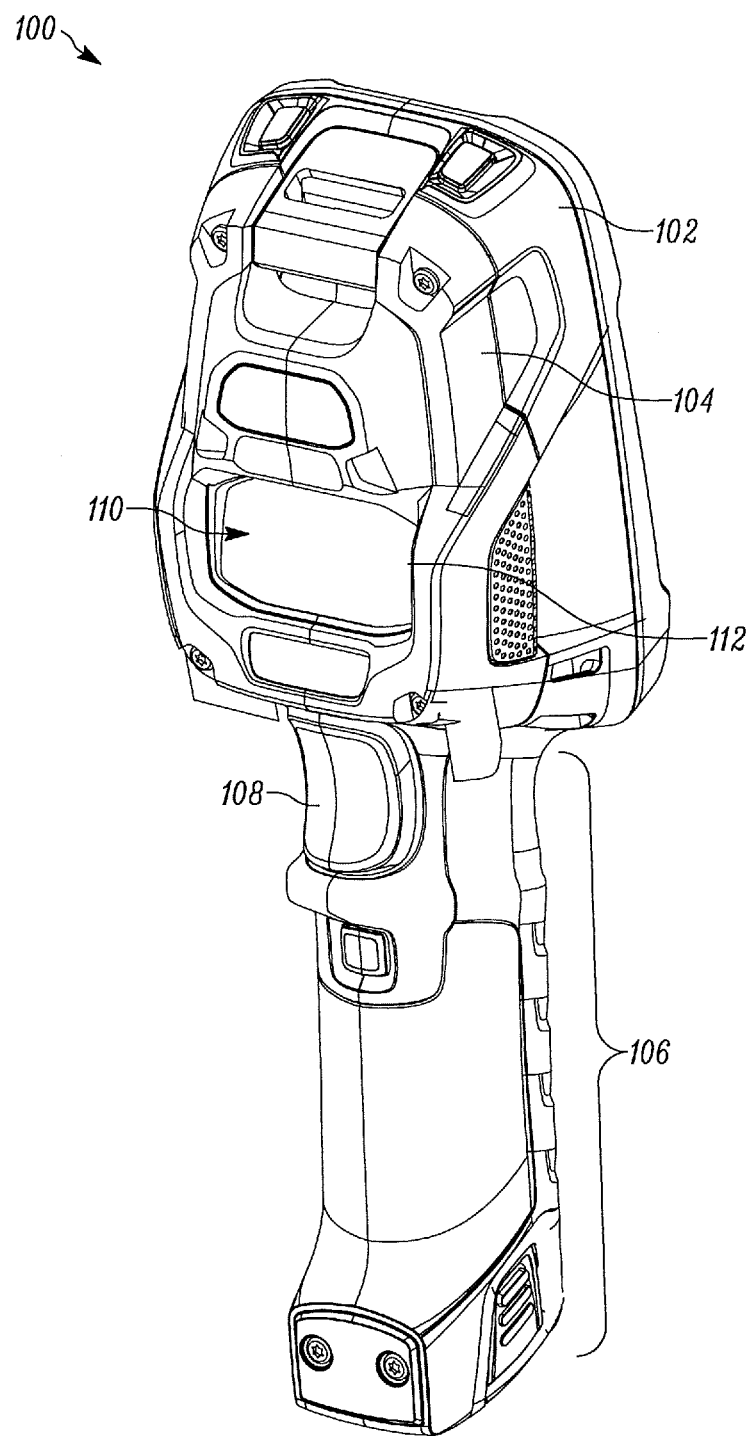
FIG. 1 depicts a scanner, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment takes the form of an apparatus that includes a scanner. The scanner includes a device housing, a data-acquisition module located within the device housing, a detachable rear bezel affixed to the device housing, and a desiccant cartridge removably attached to an interior wall of the detachable rear bezel.

Another embodiment takes the form of a system that includes a communication interface, a processor, and data storage containing instructions executable by the processor for implementing at least the modules described in the preceding paragraph.

In at least one embodiment, the device housing comprises a pistol grip portion. In at least one such embodiment, a control for activating the data-acquisition module comprises a trigger attached to the pistol grip portion.

In at least one embodiment, the data acquisition module comprises at least one of a laser scanner, an imager, an NFC reader, a proximity sensor, a WiFi module, a Bluetooth module, and a radio-frequency identification (RFID) reader.

In at least one embodiment, the detachable rear bezel is affixed to the device housing via screws. In at least one such embodiment, at least a portion of the removable screws fasten the desiccant cartridge to the interior wall of the detachable rear bezel.

In at least one embodiment, the desiccant cartridge is shaped to fit within a complementary opening in the device housing. In at least one such embodiment, the desiccant cartridge is sized to substantially entirely fill the complementary opening in the device housing while still leaving a gap between an end of the desiccant cartridge and the data acquisition module.

In at least one embodiment, the desiccant cartridge is removably attached to the interior wall of the detachable rear bezel via a snap-lock connection. In at least one such embodiment, the strength of the snap-lock connection is such that the desiccant cartridge breaks when improper removal is attempted.

In at least one embodiment, the detachable rear bezel comprises a sealing gasket groove configured to isolate the desiccant cartridge and an interior of the device housing from an exterior of the device housing.

In at least one embodiment, the device housing comprises a sealing gasket configured to isolate the desiccant cartridge and an interior of the device housing from an exterior of the device housing.

In at least one embodiment, the detachable rear bezel comprises an aperture, wherein the aperture provides the data acquisition module line-of-sight access to an exterior of the device housing.

In at least one embodiment, the desiccant cartridge includes a semi-permeable membrane that (i) permits air flow between a desiccant material located within the desiccant cartridge and an interior of the device housing and (ii) prevents the passage of the desiccant material from the desiccant cartridge to the interior of the device housing.

In at least one such embodiment, the desiccant material located within the desiccant cartridge is replaceable via factory servicing. In at least one other such embodiment, the semi-permeable membrane is a mesh screen.

One embodiment takes the form of an apparatus that includes a detachable rear bezel. The detachable rear bezel is configured to be affixed to a device housing and a desiccant cartridge is removably attached to an interior wall of the detachable rear bezel. The desiccant cartridge includes a semi-permeable membrane that (i) permits air flow between a desiccant material located within the desiccant cartridge and an interior of the device housing and (ii) prevents the passage of the desiccant material from the desiccant cartridge to the interior of the device housing.

In at least one embodiment, the detachable real bezel is affixed to the device housing via screws.

In at least one embodiment, the desiccant cartridge is shaped to fit within a complementary opening in the device housing.

In at least one embodiment, the desiccant cartridge is removably attached to the interior wall of the detachable rear bezel via a snap-lock connection.

One embodiment takes the form of an apparatus that includes a desiccant cartridge. The desiccant cartridge is configured to be removably attached to an interior wall of a detachable rear bezel. The desiccant cartridge includes a semi-permeable membrane that (i) permits air flow between a desiccant material located within the desiccant cartridge and an interior of a device housing and (ii) prevents the passage of the desiccant material from the desiccant cartridge to the interior of the device housing. The detachable rear bezel is configured to be affixed to the device housing and the desiccant cartridge is shaped to fit within a complementary opening in the device housing.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts a scanner, in accordance with some embodiments. In particular, FIG. 1 depicts a scanner 100 that includes a device housing 102, a detachable rear bezel 104 affixed to the device housing 102, and a data-acquisition module 110. FIG. 1 further depicts the device housing 102 including a pistol grip 106. A trigger 108 is attached to the pistol grip 106. A window 112 is included as part of the device housing 102 as well.

The scanner 100 is configured to capture various forms of information via the data-acquisition module 110. When a control for activating the data-acquisition module 110 is triggered at least one sensor, included as part of the data-acquisition module 110, records information that the data-acquisition module 110 is in view of. Many different types of information may be recorded, such as a barcode, QR code, image, radio-frequency identification data, and other data types of data may be listed as well. The type(s) of data that is able to be captured by the scanner 100 is governed by the type(s) of sensor(s) included as part of the data-acquisition module 110.

The device housing 102 functions as part of a protective enclosure for various internal components included within the scanner 100. The device housing 102 may be composed of any suitable material or combination of materials such as a plastic, metal, rubber, ceramic, etc. When the device housing 102 is coupled with the rear bezel 104 an interior of the device housing 102 and an interior of the rear bezel 104 are IP sealed (e.g., IP 65). In this manner, the interior of the device housing 102 and the interior of the rear bezel 104 are substantially isolated from an external environment. This reduces an amount of air (and therefore water vapor) flowing between the interior of the scanner 100 and the exterior environment.

Ambient water vapor within the scanner 100 can cause condensation to build up on (i) internal electronic components causing damage as well as (ii) lenses and other optical components of the data-acquisition module 110 rendering them ineffective as well as (iii) the window of the device housing 102 causing unwanted lensing. This phenomenon can occur when the scanner 100 transitions from a warm environment to a cool one. A desiccant material is used to mitigate this issue.

Figure 4:
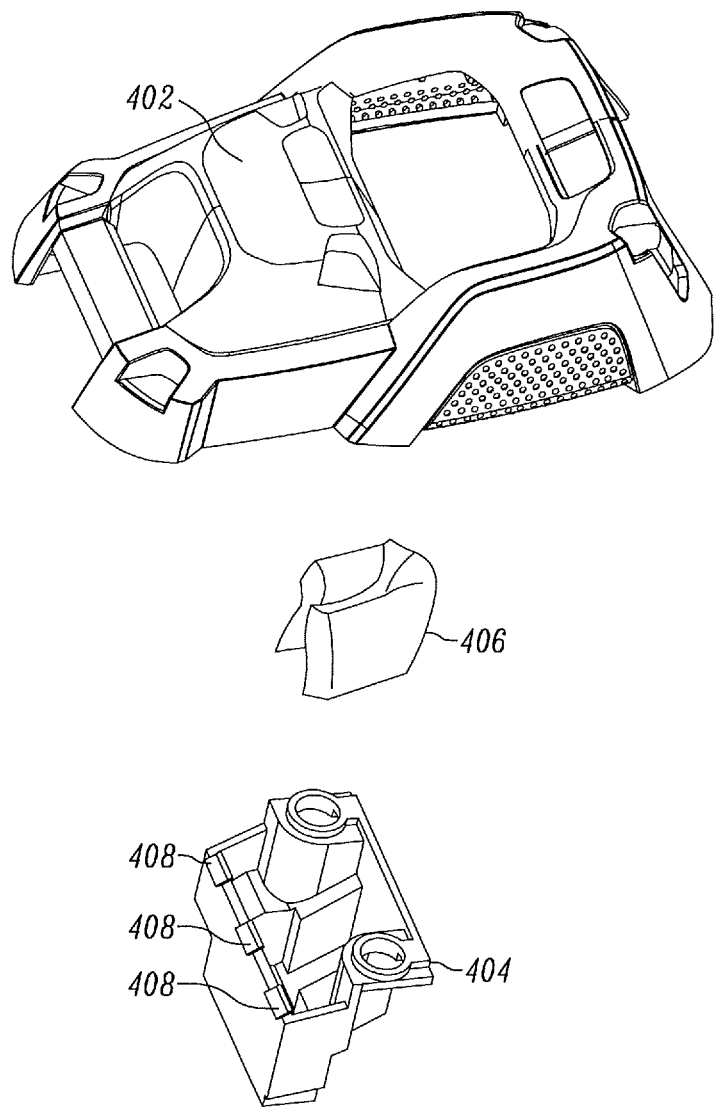
FIG. 4 depicts a rear bezel, a desiccant cartridge and a desiccant material, in accordance with some embodiments.

The rear bezel 104 is discussed in further detail in the description of FIG. 4. The pistol grip 106 allows a user of the scanner 100 to hold the scanner 100 comfortably. Many other form factors may be used to embody the device housing 102. The trigger 108 is a control for activating the data-acquisition module 110. Although many of the FIGs. in the balance of this disclosure depict a scanner including the pistol grip 106 and the trigger 108, these two elements are explicitly not required features of the apparatus disclosed herein. The data-acquisition module 110 is discussed in further detail in the description of FIG. 2.

The device housing 102 includes the window 112 through which the data-acquisition module 110 may view an external environment. The window 112 may be made of any suitable material such as glass, plastic, sapphire, etc. The scanner 100 further includes a desiccant cartridge removably attached to an interior wall of the detachable rear bezel 104. The desiccant cartridge is not visible in FIG. 1 as it is located within the scanner 100. For at least this reason, the desiccant cartridge is discussed in the latter part of this disclosure.

Figure 2:
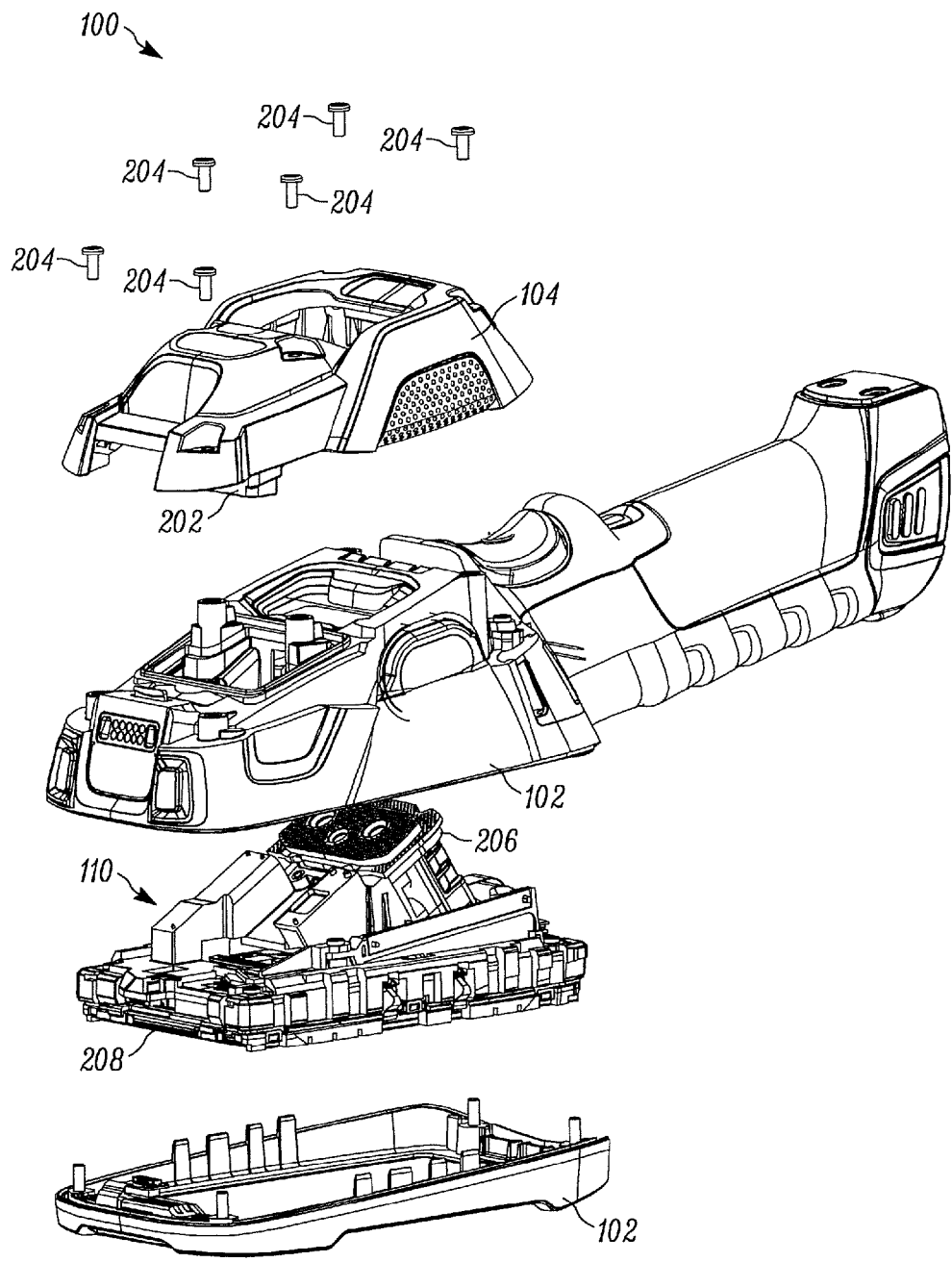
FIG. 2 depicts an exploded view of the scanner of FIG. 1, in accordance with some embodiments.

FIG. 2 depicts an exploded view of the scanner of FIG. 1, in accordance with some embodiments. In particular, FIG. 2 depicts several components of the scanner 100. FIG. 2 depicts the device housing 102, the detachable rear bezel 104, and the data-acquisition module 110. FIG. 2 further depicts a desiccant cartridge 202 removably attached to the interior wall of the detachable rear bezel 104, screws 204, a sensor 206, and a support frame 208.

The data acquisition module 110 includes sensor 206 which includes at least one of a laser scanner, an imager, an NFC reader, a proximity sensor, a WiFi module, a Bluetooth module, and a radio-frequency identification (RFID) reader, etc. The data-acquisition module 110 may include a support frame 208, wherein the sensors 206 are attached to the support frame 208 and the support frame 208 is attached to the device housing 102. The support frame 208 may be a vibration-dampening support frame that reduces a peak acceleration of the sensor 206 by employing either dampening materials such as rubber or silicon or by employing a mechanical or electro-mechanical dampening system.

The desiccant cartridge 202 is removably attached to the interior wall of the detachable rear bezel 104. The desiccant cartridge contains a factory-replaceable desiccant material that absorbs water vapor located within the scanner 100. The screws 204 affix the rear bezel 104 to the device housing 102. The screws may be tightened to seal the scanner 100 or loosened to remove the rear bezel 104 from the device housing 102. A user may replace the rear bezel 104 (with attached desiccant cartridge 202) through use of the screws 204. In some scanners, at least a portion of the removable screws 204 further fasten the desiccant cartridge 202 to the interior wall of the detachable rear bezel 104. In FIG. 2, a middle two screws further fasten the desiccant cartridge 202 to the interior wall of the detachable rear bezel 104.

Figure 3:
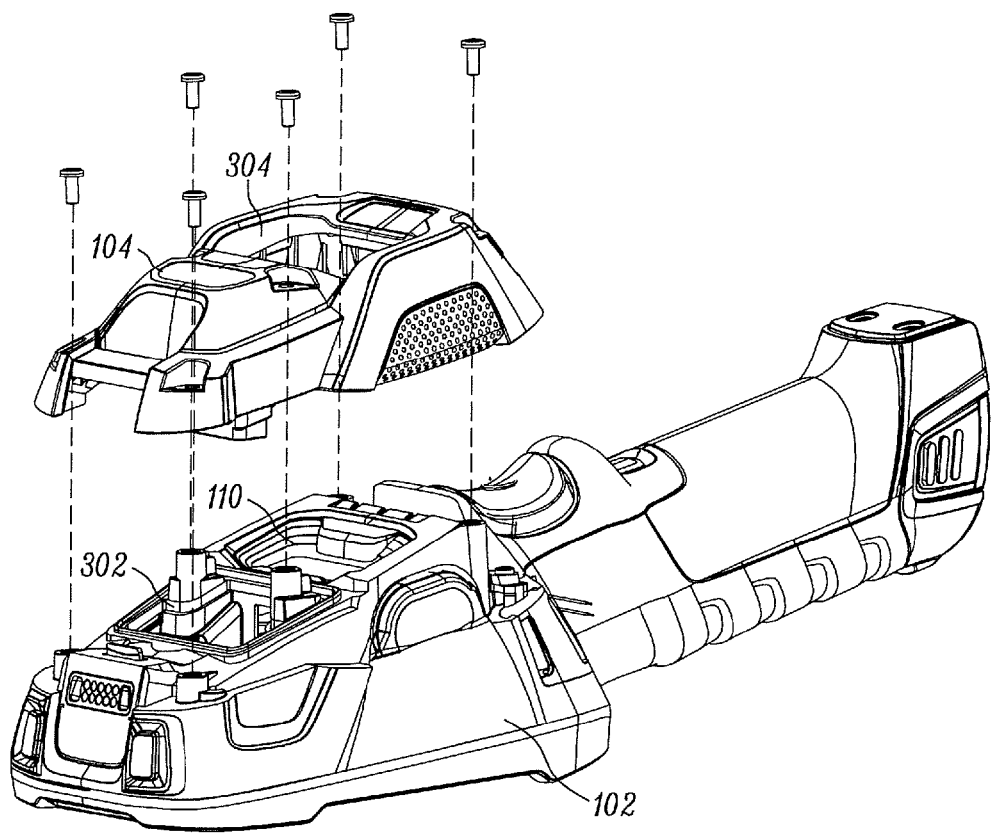
FIG. 3 depicts the scanner of FIG. 1 with the rear bezel removed, in accordance with some embodiments.

FIG. 3 depicts the scanner of FIG. 1 with the rear bezel removed, in accordance with some embodiments. In particular, FIG. 3 depicts the scanner 100 of FIG. 1 with the rear bezel 104 detached. While the screws 204 of FIG. 2 are removed the rear bezel 104 is detached from the device housing 102.

FIG. 3 further depicts the scanner 100 including a complementary opening 302 and an aperture 304. A desiccant cartridge (e.g., the desiccant cartridge 202) is shaped to fit within the complementary opening 302. In at least one such embodiment, the desiccant cartridge is sized to substantially entirely fill the complementary opening 302 while still leaving a gap between an end of the desiccant cartridge and the data acquisition module 110. If the data-acquisition module 110 includes a dampening support frame it is necessary to leave space for relative movement between the data-acquisition module 100 and the desiccant cartridge as normal use includes drops, shakes, shocks, and the like and a collision must be avoided.

The detachable rear bezel 104 comprises an aperture 304. The aperture 304 provides the data acquisition module 110 (or specifically the sensors therein) line-of-sight access through the window 112 to an exterior of the device housing 102. Sensors such as a barcode scanner must be able to view a barcode that is to be scanned. The aperture 304 and window 112 facilitate this.

FIG. 4 depicts a rear bezel, a desiccant cartridge and a desiccant material, in accordance with some embodiments. In particular, FIG. 4 depicts a detachable rear bezel 402, a desiccant cartridge 404 having a snap-lock 408, and a desiccant material 406. The detachable rear bezel 104 and the desiccant cartridge 202 may be embodied as the detachable rear bezel 402 and the desiccant cartridge 404, respectively.

The detachable rear bezel 402 is configured to be affixed to a device housing and the desiccant cartridge 404 may be removably attached to an interior wall of the detachable rear bezel 402. The desiccant cartridge houses the desiccant material 406. The desiccant material 406 may be a silica gel packet or silica beads or some other known desiccant material.

In at least one embodiment, the desiccant material 406 located within the desiccant cartridge 404 is replaceable via factory servicing. A factory service may be a process performed at a service location or by a service technician. The process for removing the desiccant cartridge 404 from the rear bezel 402 and replacing the desiccant material 406 may involve use of specialized tools or hardware.

A semi-permeable membrane in the desiccant cartridge 404 (i) permits air flow between the desiccant material 406 located within the desiccant cartridge 404 and an interior of the device housing and (ii) prevents the passage of the desiccant material 406 from the desiccant cartridge 404 to the interior of the device housing. The semi-permeable membrane is discussed in more detail in the description of FIG. 10.

In at least one embodiment, the detachable real bezel 402 is affixed to a device housing via screws. In at least one embodiment, the desiccant cartridge 404 is shaped to fit within a complementary opening in a device housing. In at least one embodiment, the desiccant cartridge 404 is removably attached to the interior wall of the detachable rear bezel 402 via a snap-lock connection such as the snap-lock 408. The snap-lock connection 408 is depicted as including 3 snap-lock elements, however any number of snap-lock elements may be employed. The snap-lock 408 is discussed in greater detail in the description of FIG. 7.

Figure 5:
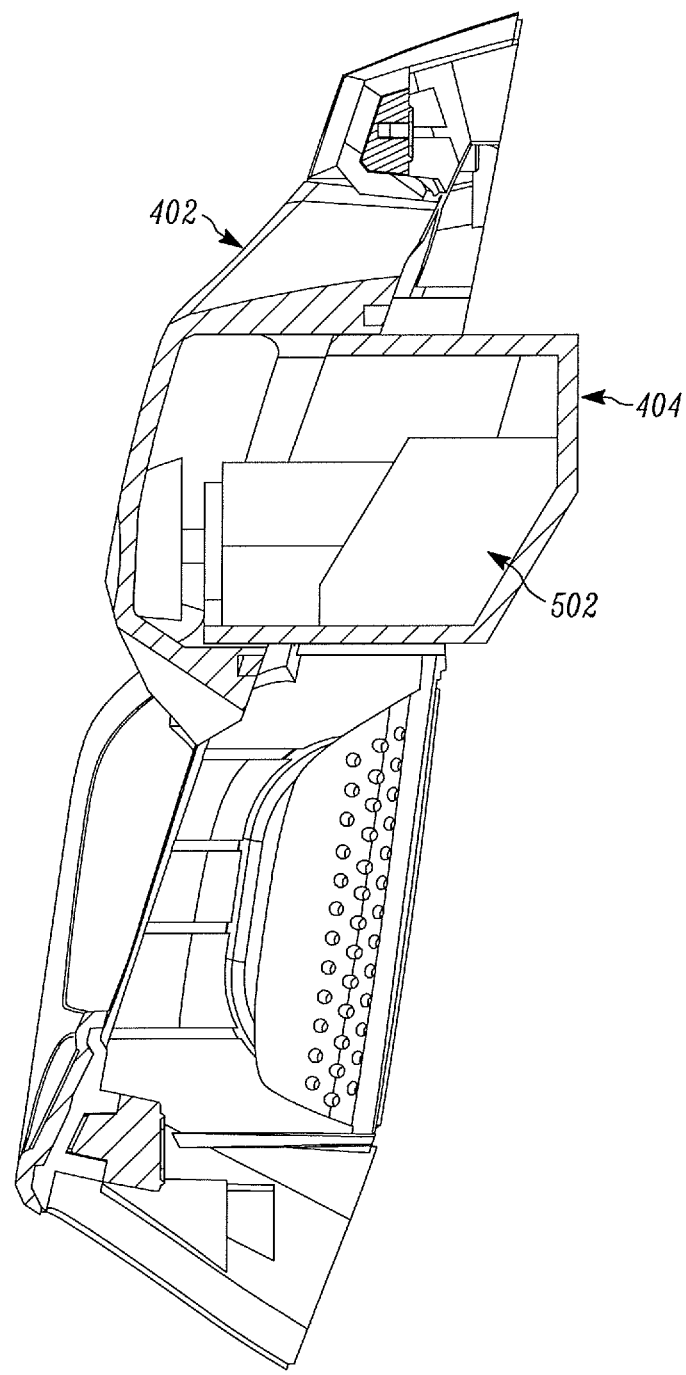
FIG. 5 depicts a cross-section of the rear bezel and desiccant cartridge of FIG. 4, in accordance with some embodiments.

FIG. 5 depicts a cross-section of the rear bezel and desiccant cartridge of FIG. 4, in accordance with some embodiments. In particular, FIG. 5 depicts the detachable rear bezel 402 with the attached desiccant cartridge 404. FIG. 5 further depicts a desiccant material chamber 502. The desiccant material 406 is located within the desiccant cartridge 404, specifically within the desiccant material chamber 502.

Figure 6:
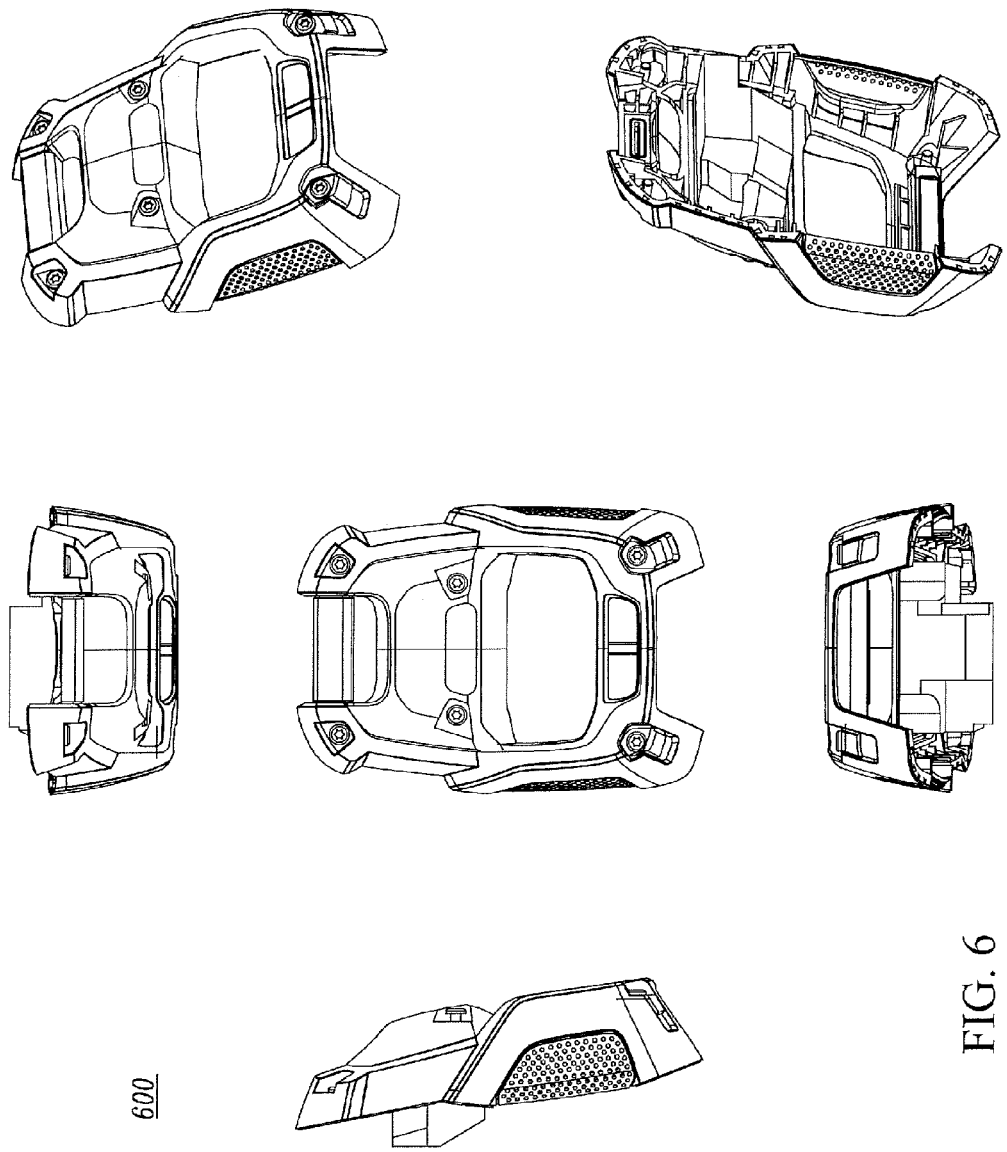
FIG. 6 depicts ancillary views of the rear bezel and desiccant cartridge of FIG. 4, in accordance with some embodiments.

FIG. 6 depicts ancillary views of the rear bezel and desiccant cartridge of FIG. 4, in accordance with some embodiments. The ancillary views 600 help define the novel shape, and relative dimensions of the rear bezel 402 when mated with the desiccant cartridge 404. Furthermore, the ancillary views 600 depict various perspectives of an exterior wall of the rear bezel 402 which is shaped to sit within a docking apparatus. This is discussed in further detail in the description of FIG. 15.

Figure 7:
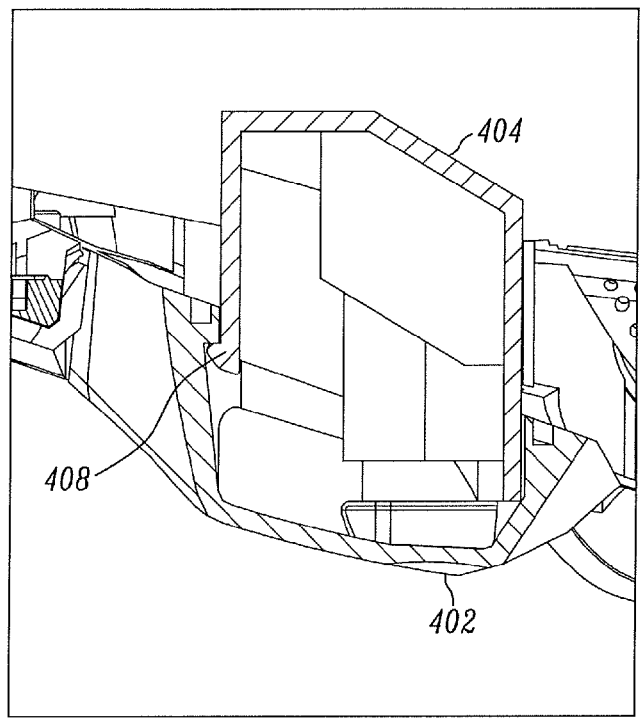
FIG. 7 depicts a snap-lock connection between the rear bezel of FIG. 4 and the desiccant cartridge of FIG. 4, in accordance with some embodiments.

FIG. 7 depicts a snap-lock connection between the rear bezel of FIG. 4 and the desiccant cartridge of FIG. 4, in accordance with some embodiments. The desiccant cartridge 404 is removably attached to the interior wall of the detachable rear bezel 402 via the snap-lock 408. In at least one embodiment, the strength of the snap-lock 408 is such that the desiccant cartridge 404 breaks when improper removal is attempted (i.e., removal not performed via factory servicing). This may be accomplished by manufacturing the desiccant cartridge 404 and snap-lock 408 such that a force required by a user to grip and remove the desiccant cartridge 404 is greater than a force tolerable by the desiccant cartridge 404 or the snap-lock 408. In this way it is impossible for a user to grip the desiccant cartridge 404 hard enough to separate it from the rear bezel 402 without breaking the desiccant cartridge 404. In yet another embodiment, however, the connection strength of the snap-lock 408 is calibrated so as to allow the desiccant cartridge 404 to be field-replaceable without being damaged.

Figure 8:
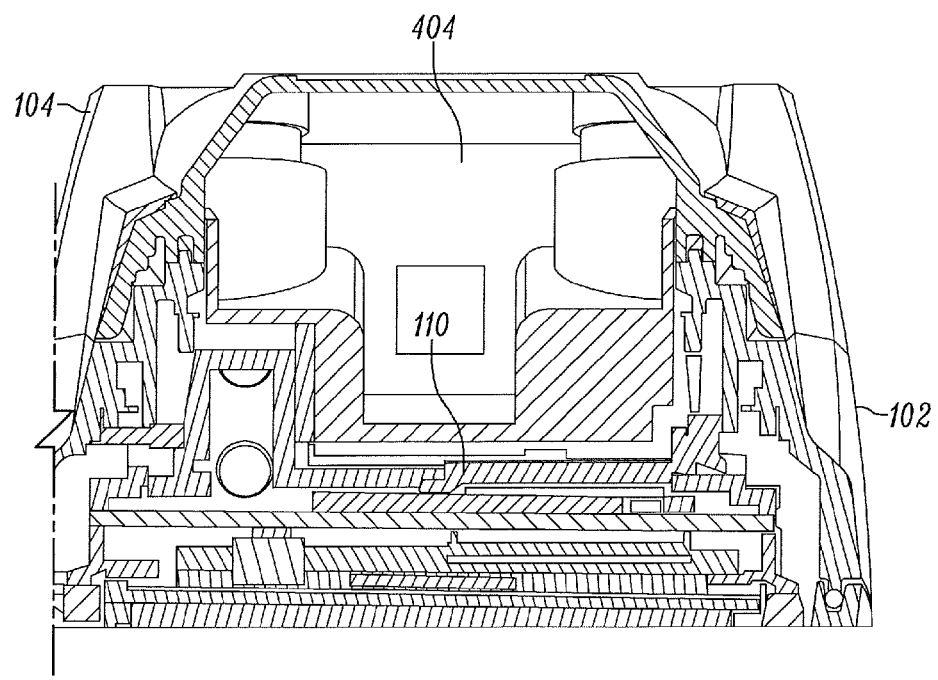
FIG. 8 depicts an ancillary view of the snap-lock connection of FIG. 7, in accordance with some embodiments.
Figure 9:
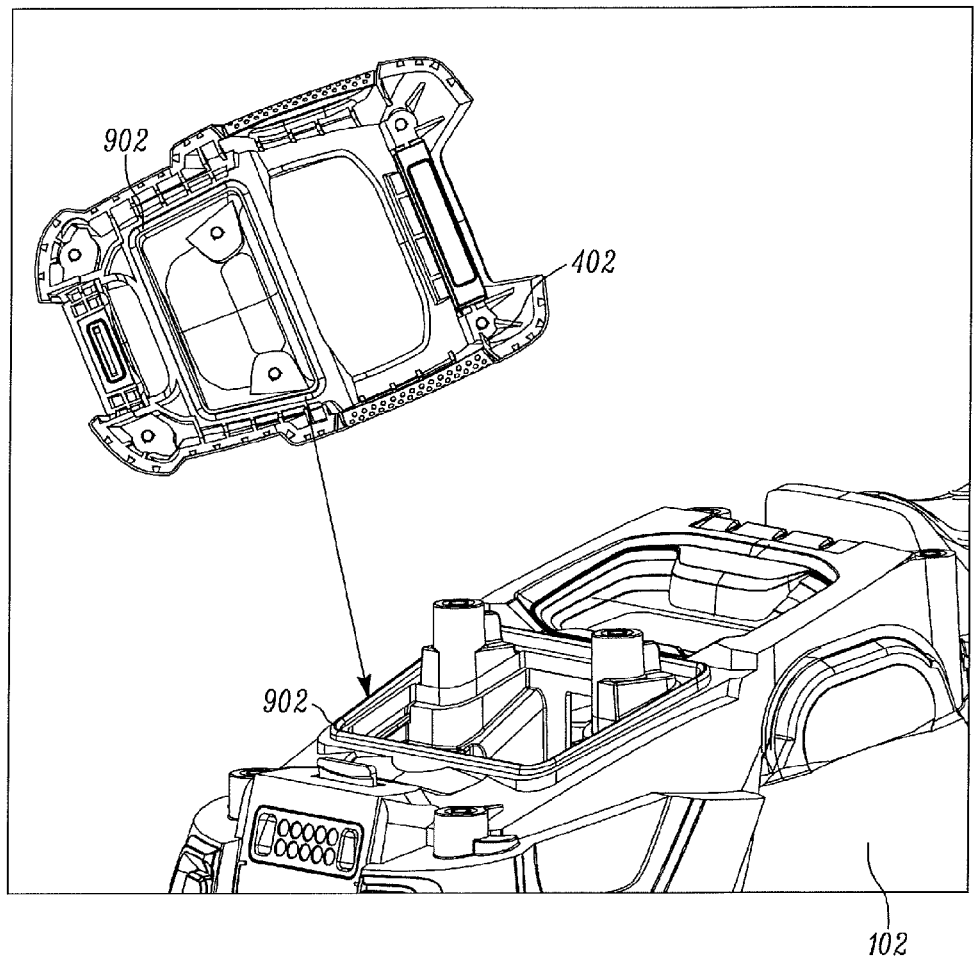
FIG. 9 depicts the rear bezel of FIG. 4 with a sealing gasket groove and a device housing with a complementary sealing gasket, in accordance with some embodiments.

FIG. 8 depicts a cross-section of the rear bezel, desiccant cartridge and device housing, in accordance with some embodiments. In particular, FIG. 8 depicts a cross-sectional view 800 which includes the detachable rear bezel 104, the desiccant cartridge 404, the device housing 102, and the data-acquisition module 110. The desiccant cartridge 404 is shaped and sized to substantially entirely fill the complementary opening in the device housing 102 while still leaving a gap between an end of the desiccant cartridge 404 and the data acquisition module 110. The detachable rear bezel 104 is depicted as being attached to the device housing 102. An IP seal is formed when the detachable rear bezel 402 is attached to the device housing 102. FIG. 9 depicts the rear bezel of FIG. 4 with a sealing gasket groove and a device housing with a complementary sealing gasket, in accordance with some embodiments. The detachable rear bezel 402 comprises a sealing gasket groove 902 configured to isolate the desiccant cartridge 404 and an interior of the scanner 100 from an exterior of the scanner 100. The device housing 102 includes a complementary sealing gasket 904. The complementary sealing gasket 904 is made of silicon but other materials are suitable. The sealing gasket 902 and complementary sealing gasket 904 are the same shape and size. When the rear bezel 404 is attached and screwed into the device housing 102 the sealing gasket groove 902 is pressed up against the sealing gasket 904 forming an IP seal.

Figure 10:
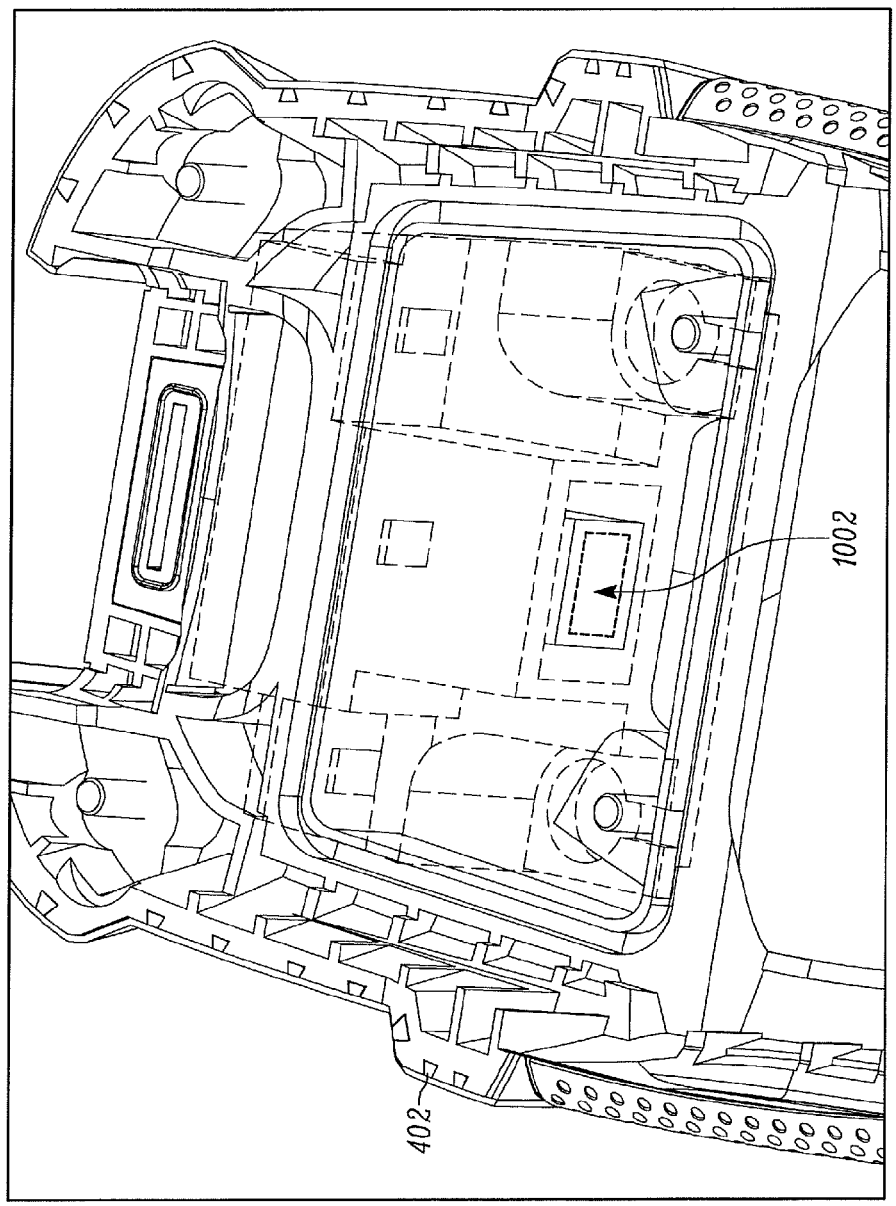
FIG. 10 depicts the desiccant cartridge of FIG. 4 with a semi-permeable membrane, in accordance with some embodiments.

FIG. 10 depicts the desiccant cartridge of FIG. 4 with a semi-permeable membrane, in accordance with some embodiments. The desiccant cartridge 404 includes a semi-permeable membrane 1002 that (i) permits air flow between a desiccant material 406 located within the desiccant cartridge 404 and an interior of the device housing 102 and (ii) prevents the passage of the desiccant material 406 from the desiccant cartridge 404 to the interior of the device housing 102. In at least one such embodiment, the semi-permeable membrane 1002 is a mesh screen however, other materials and devices may be employed instead.

Figure 11:
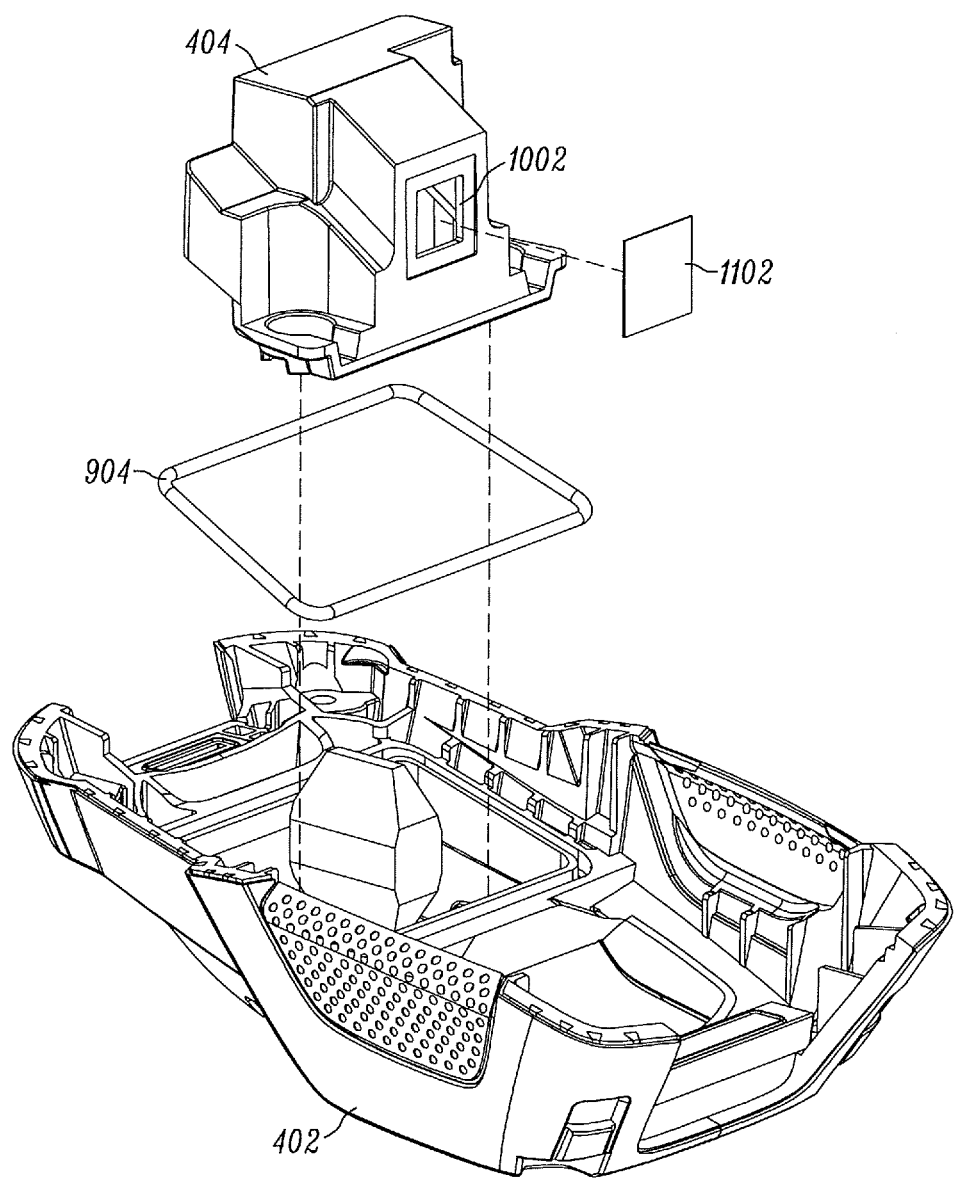
FIG. 11 depicts an exploded view of the rear bezel and the desiccant cartridge of FIG. 4, in accordance with some embodiments.

FIG. 11 depicts an exploded view of the rear bezel and the desiccant cartridge of FIG. 4, in accordance with some embodiments. In particular, FIG. 11 depicts the rear bezel 402, the sealing gasket 904, the desiccant cartridge 404, and a factory seal 1102. The semi-permeable membrane 1002 may be covered at the factory with the factory seal 1102 (e.g., temporary adhesive tape). The factory seal prevents the passage of air through the semi-permeable membrane 1002 until the desiccant cartridge 404 is to be installed. A user or service technician removes the factory seal before installing a replacement rear bezel with desiccant cartridge attached.

An alternative interpretation of FIG. 11 defines the element 1002 as an opening in the desiccant cartridge 404 and the element 1102 as the semi-permeable membrane. In such a description the semi-permeable membrane 1102 is depicted as not being attached to the desiccant cartridge 404 but this is a result of the image being an exploded view of the device. Indeed, the semi-permeable membrane 1102 is attached to the desiccant cartridge 404. For the purpose of safe transportation and device longevity, instead of (or in addition to) a factory seal, the desiccant bezel assembly (i.e, the removable rear bezel and the attached desiccant cartridge) may be shipped in a vacuum sealed bag. An extra desiccant satchel is included within the bag to ensure the desiccant is kept in its original condition before reaching a customer.

Figure 12:
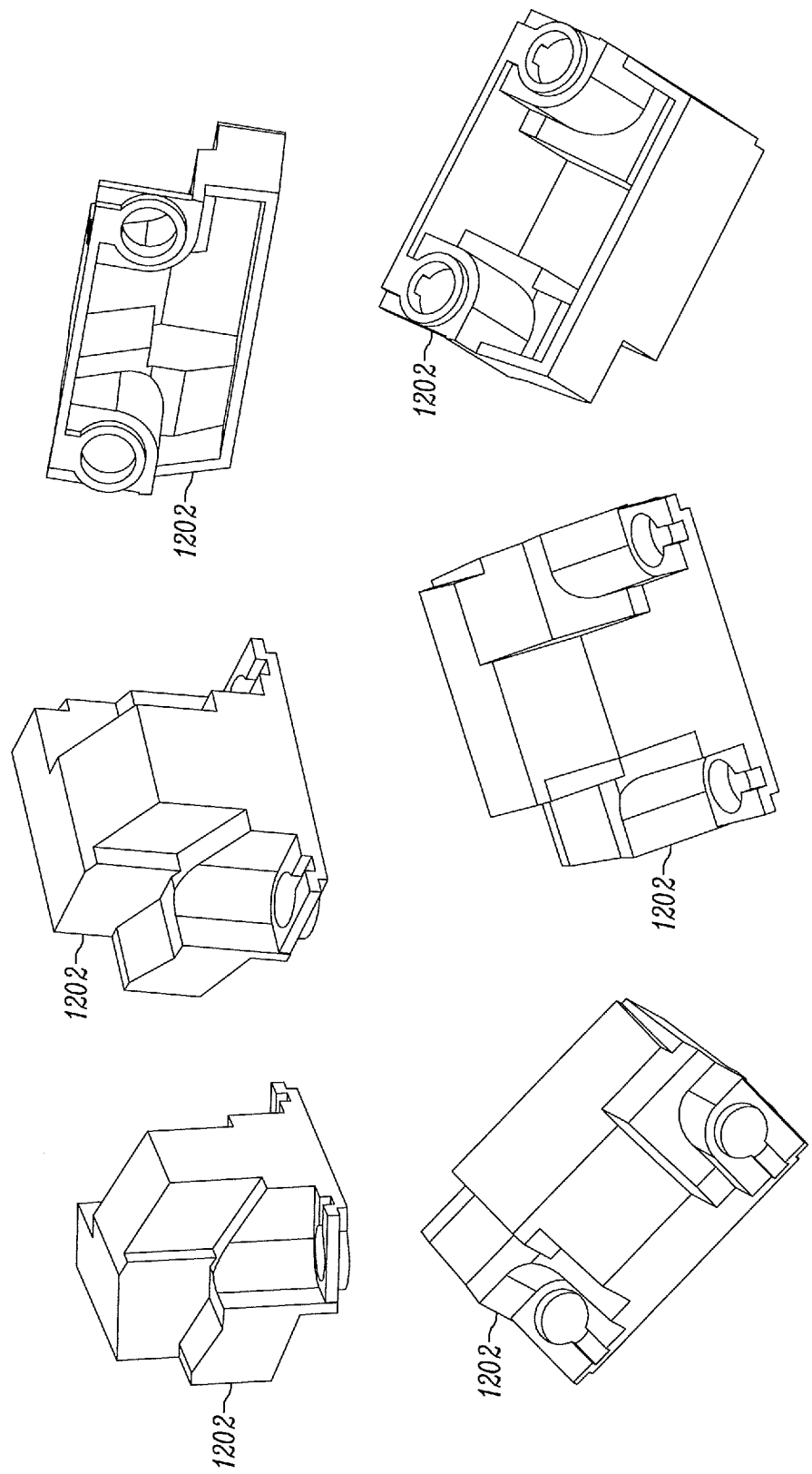
FIG. 12 depicts several views of a desiccant cartridge, in accordance with some embodiments.

FIG. 12 depicts several views of a desiccant cartridge, in accordance with some embodiments. In particular, FIG. 12 depicts various perspectives of a desiccant cartridge 1202. The desiccant cartridge 202 and/or 404 may be embodied as the desiccant cartridge 1202. The various views help to define the novel shape and relative dimensions of the desiccant cartridge 1202. It is noted that a shape of the desiccant cartridge 1202 is substantial multi-planar. Few curved surfaces are present, with the exception of areas for the screws 204, a portion of which, fasten the rear bezel 404 to the device housing 102 through the desiccant cartridge 1202. The desiccant cartridge 1202 is configured to house a desiccant material which absorbs ambient water vapor from within a device housing while the desiccant cartridge 1202 is installed.

In at least one such embodiment, the desiccant cartridge is sized to substantially entirely fill a complementary opening in a device housing while still leaving a gap between an end of the desiccant cartridge 1202 and a data acquisition module. If the data-acquisition module includes a dampening support frame it is necessary to leave space for relative movement between the data-acquisition module and the desiccant cartridge 1202 as normal use includes drops, shakes, shocks, and the like and a collision must be avoided.

The desiccant cartridge 1202 may be designed to maximize a volume available to be filled with the desiccant material. This can be done using computer software (e.g., CAD) which takes into account the shape of the complementary opening in the device housing. An external surface of the desiccant cartridge 1202 is designed to fit against an internal surface of the complementary opening. The walls of the desiccant cartridge are designed and sized to maximize inner volume while still meeting structural requirements (e.g., exterior shape, durability, flexibility, etc.).

One embodiment disclosed herein takes the form of an apparatus that includes the desiccant cartridge 1202. The desiccant cartridge 1202 is configured to be removably attached to an interior wall of a detachable rear bezel. The desiccant cartridge 1202 includes a semi-permeable membrane that (i) permits air flow between a desiccant material located within the desiccant cartridge 1202 and an interior of a device housing and (ii) prevents the passage of the desiccant material from the desiccant cartridge 1202 to the interior of the device housing. The detachable rear bezel is configured to be affixed to a device housing and the desiccant cartridge 1202 is shaped to fit within a complementary opening in the device housing.

The desiccant cartridge 1202 may be composed of any suitable material such as plastic, metal, ceramic, etc. and the desiccant cartridge 1202 may include a snap-lock connection for attaching the desiccant cartridge 1202 to an interior wall of a detachable rear bezel.

Figure 13:
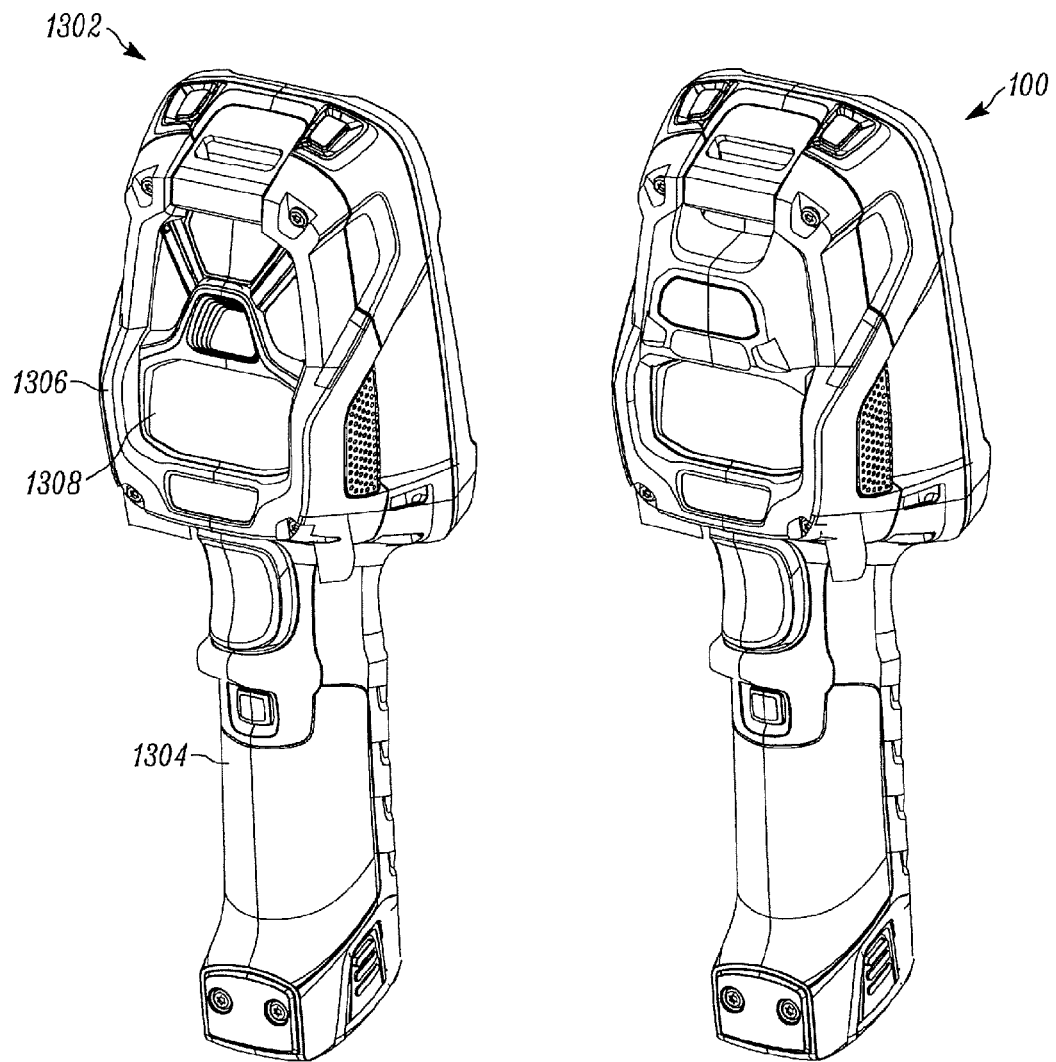
FIG. 13 depicts two scanners with various rear bezels, in accordance with some embodiments.

FIG. 13 depicts two scanners with various rear bezels, in accordance with some embodiments. In particular, FIG. 13 depicts (i) a scanner 1302 including a device housing 1304, a rear bezel 1306, a data-acquisition module 1308 and (ii) the scanner 100. The device housing 1304 may substantially the same as the device housing 102.

FIG. 13 highlights various differences between the scanner 100 of the present disclosure and a different scanner 1302 that does not include a removably attached desiccant cartridge. Since the scanner 1302 does not include a removably attached desiccant cartridge, it includes a different rear bezel 1306 which may be detachable via screws so as to grant access to a microSD card slot and a connector for an expansion module. The scanner 1302 includes the data-acquisition module 1308 which includes additional sensors and elements to those in the data-acquisition module 110. Such additional sensors and elements of scanner 1302 are disposed in place of the removably attached desiccant cartridge of the scanner 100 of the present disclosure and may require the corresponding windows or openings in the rear bezel 1306.

Figure 14:
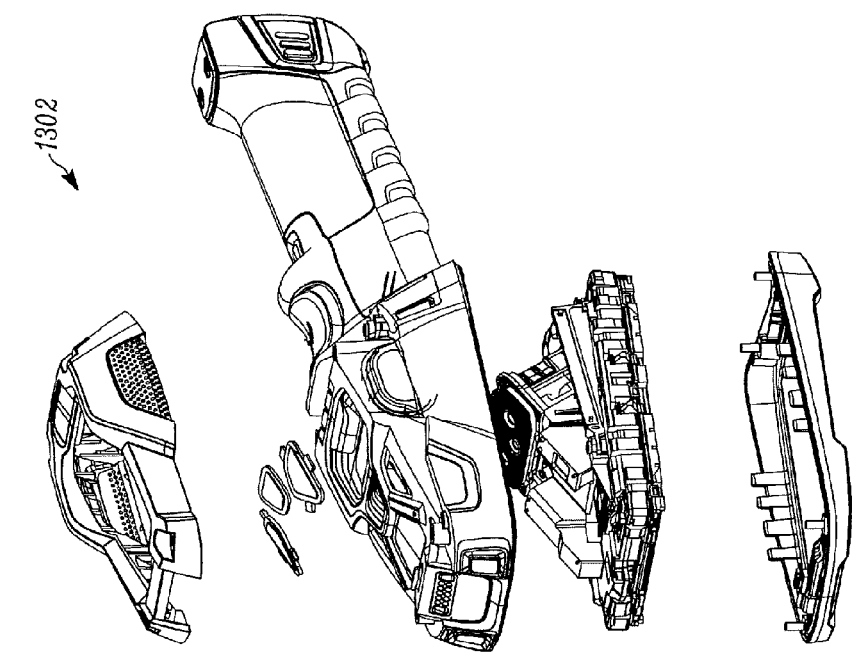
FIG. 14 depicts exploded views of the two scanners of FIG. 13, in accordance with some embodiments.
Figure 14:
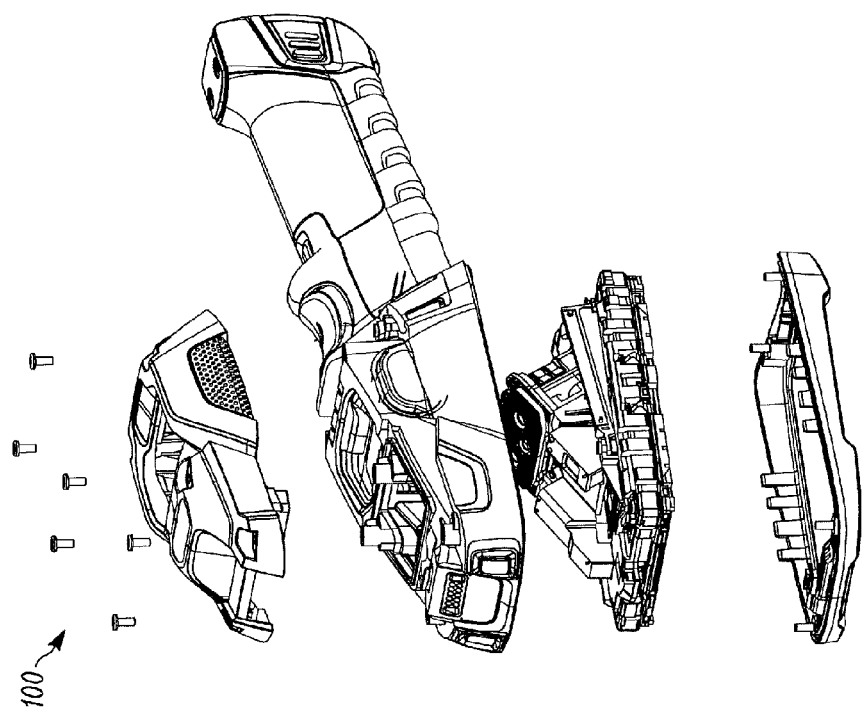

FIG. 14 depicts exploded views of the two scanners of FIG. 13, in accordance with some embodiments. In particular, FIG. 14 depicts further differences between the two scanners. As described above, in the depicted example, the scanner 100 includes a different data-acquisition module and a different detachable rear bezel than the scanner 1302 and a different detachable rear bezel.

Figure 15:
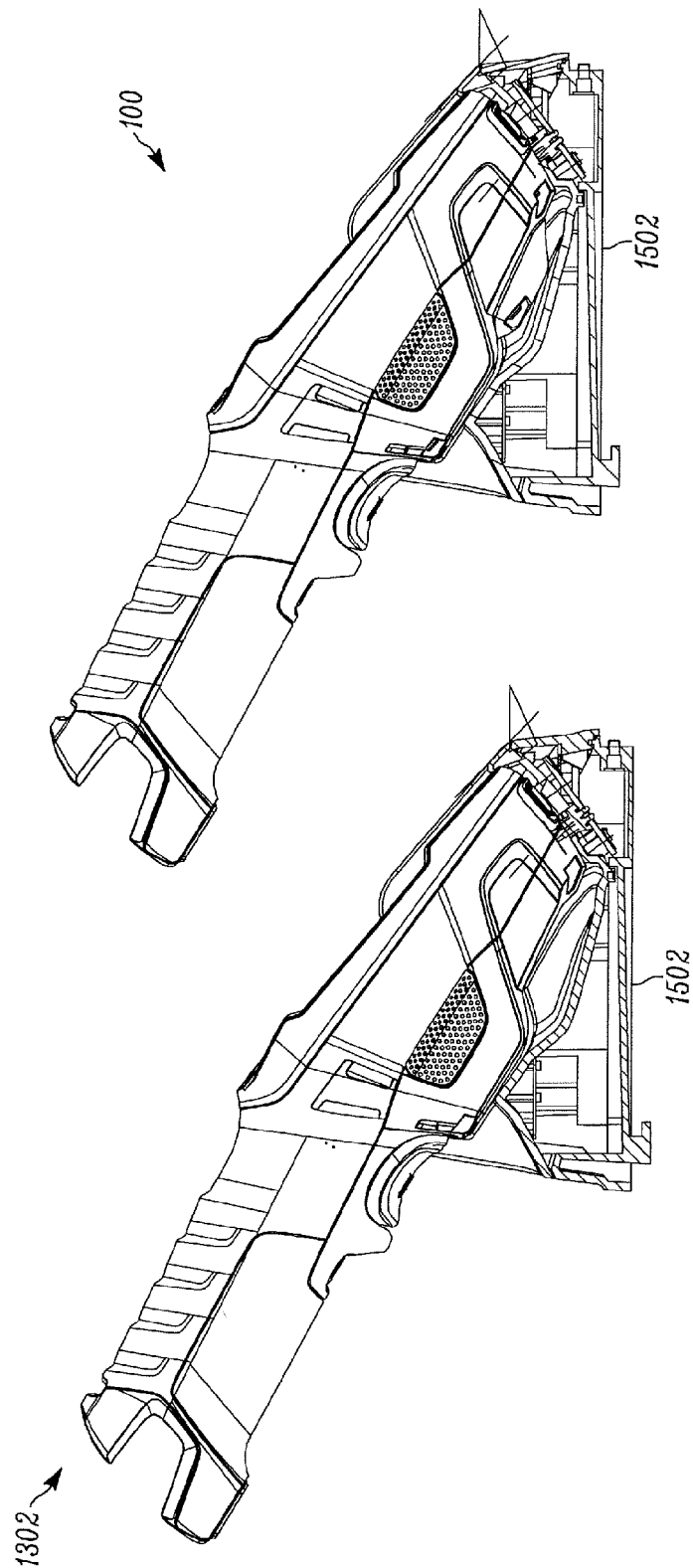
FIG. 15 depicts the two scanners of FIG. 13 and docking apparatuses, in accordance with some embodiments.

FIG. 15 depicts the two scanners of FIG. 13 and a docking apparatus, in accordance with some embodiments. In particular, FIG. 15 depicts the scanner 100 and the scanner 1302 as docked in a respective dock 1502. The dock 1502 may be a common design usable by both the scanner 100 and the scanner 1302. The shape of the dock 1502 is configured to mate with the shape of the detachable rear bezel 404 or the shape of the rear bezel 1306. The dock 1502 provides storage and charging functionality to the scanners disclosed herein.

Figure 16:
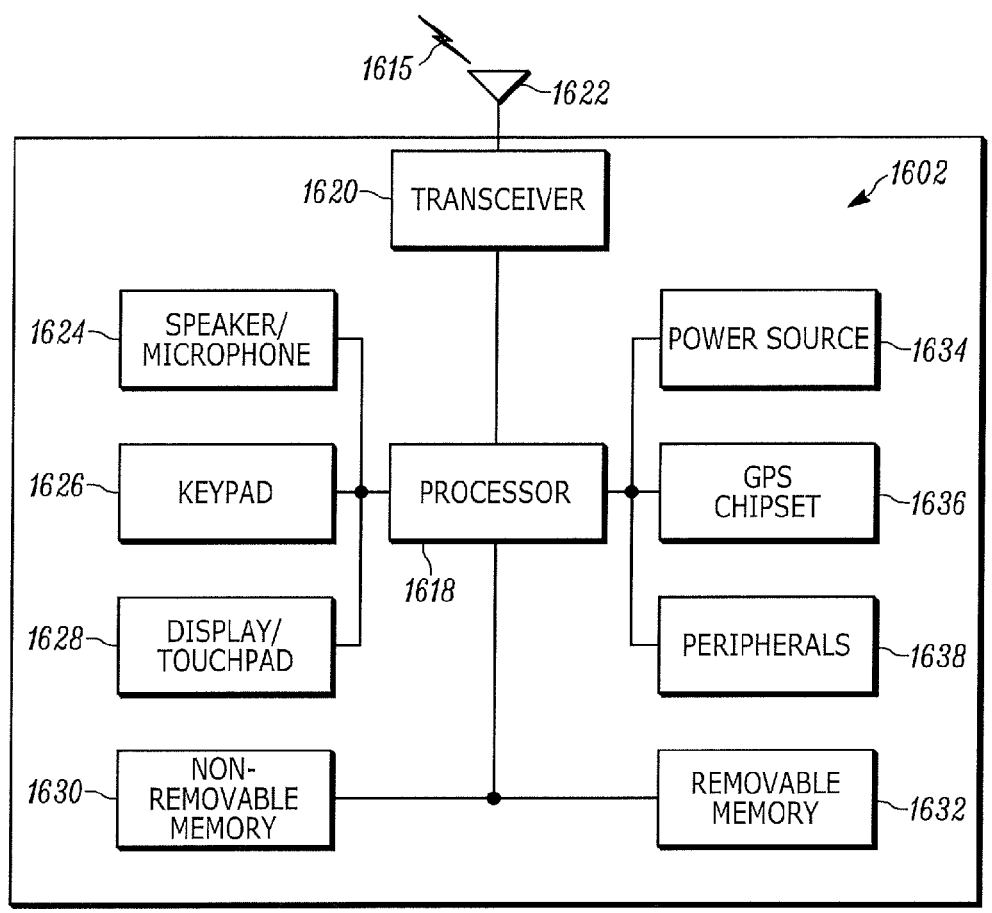
FIG. 16 depicts a computing and communication device (CCD), in accordance with some embodiments.

FIG. 16 depicts a computing and communication device (CCD), in accordance with some embodiments. Some embodiments may be implemented in a CCD, such as the CCD 1602 illustrated in FIG. 16. For example, the scanner 100 may be embodied as a CCD.

As shown in FIG. 16, the CCD 1602 may include a processor 1618, a transceiver 1620, a transmit/receive element 1622, audio transducers 1624 (preferably including at least two microphones and at least two speakers, which may be earphones), a keypad 1626, a display/touchpad 1628, a non-removable memory 1630, a removable memory 1632, a power source 1634, a GPS chipset 1636, and other peripherals 1638. It will be appreciated that the CCD 1602 may include any sub-combination of the foregoing elements while remaining consistent with an embodiment. The CCD 1602 may further include any of the sensors described above in connection with the various embodiments. The CCD 1602 may communicate with nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The processor 1618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the CCD 1602 to carry out the functions described herein. The processor 1618 may be coupled to the transceiver 1620, which may be coupled to the transmit/receive element 1622. While FIG. 6 depicts the processor 1618 and the transceiver 1620 as separate components, it will be appreciated that the processor 1618 and the transceiver 1620 may be integrated together in an electronic package or chip.

The transmit/receive element 1622 may be configured to transmit signals to, or receive signals from, a node over the air interface 1615. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, or visible light signals, as examples. In yet another embodiment, the transmit/receive element 1622 may be configured to transmit and receive both RF and light signals. It will be appreciated that the transmit/receive element 1622 may be configured to transmit and/or receive any combination of wireless signals.

In addition, although the transmit/receive element 1622 is depicted in FIG. 16 as a single element, the CCD 1602 may include any number of transmit/receive elements 1622. More specifically, the CCD 1602 may employ MIMO technology. Thus, in one embodiment, the CCD 1602 may include two or more transmit/receive elements 1622 (e.g., multiple antennas) for transmitting and receiving wireless signals over the air interface 1615.

The transceiver 1620 may be configured to modulate the signals that are to be transmitted by the transmit/receive element 1622 and to demodulate the signals that are received by the transmit/receive element 1622. As noted above, the CCD 702 may have multi-mode capabilities. Thus, the transceiver 1620 may include multiple transceivers for enabling the CCD 1602 to communicate via multiple RATs, such as UTRA and IEEE 802.11, as examples.

The processor 1618 of the CCD 1602 may be coupled to, and may receive user input data from, the audio transducers 1624, the keypad 1626, and/or the display/touchpad 1628 (e.g., a liquid crystal display (LCD) display unit, organic light-emitting diode (OLED) display unit, head-mounted display unit, or optically transparent display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the CCD 1602, such as on a server or a home computer (not shown).

The processor 1618 may receive power from the power source 1634, and may be configured to distribute and/or control the power to the other components in the CCD 1602. The power source 1634 may be any suitable device for powering the CCD 1602. As examples, the power source 1634 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1618 may also be coupled to the GPS chipset 1636, which may be configured to provide location information (e.g., longitude and latitude) regarding the current location of the CCD 1602. In addition to, or in lieu of, the information from the GPS chipset 1636, the CCD 1602 may receive location information over the air interface 1615 from a base station and/or determine its location based on the timing of the signals being received from two or more nearby base stations. It will be appreciated that the CCD 1602 may acquire location information by way of any suitable location-determination method while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a universal serial bus (USB) port, a vibration device, a television transceiver, a hands free headset, a frequency modulated (FM) radio unit, a digital music player, a media player, a video game player module, an Internet browser, a laser scanner, an imager, an NFC reader, a proximity sensor, a WiFi module, a Bluetooth module, and a radio-frequency identification (RFID) reader and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A scanner comprising:
a device housing;
a data-acquisition module located within the device housing;
a detachable rear bezel affixed to the device housing; and
a desiccant cartridge removably attached to an interior wall of the detachable rear bezel,
wherein the desiccant cartridge is shaped to fit within complementary openings in the device housing and in the detachable rear bezel.

2. The scanner of claim 1, wherein the device housing comprises a pistol grip portion.

3. The method of claim 2, wherein a control for activating the data-acquisition module comprises a trigger attached to the pistol grip portion.

4. The scanner of claim 1 wherein the data acquisition module comprises at least one of a laser scanner, an imager, an NFC reader, a proximity sensor, a WiFi module, a Bluetooth module, and a radio-frequency identification (RFID) reader.

5. The scanner of claim 1, wherein the detachable rear bezel is affixed to the device housing via screws.

6. The scanner of claim 5, wherein at least a portion of the removable screws fasten the desiccant cartridge to the interior wall of the detachable rear bezel.

7. The scanner of claim 1, wherein the desiccant cartridge is sized to substantially entirely fill the complementary opening in the device housing while still leaving a gap between an end of the desiccant cartridge and the data acquisition module.

8. The scanner of claim 1, wherein the desiccant cartridge is removably attached to the interior wall of the detachable rear bezel via a snap-lock connection.

9. The scanner of claim 8, wherein the strength of the snap-lock connection is such that the desiccant cartridge breaks when improper removal is attempted.

10. The scanner of claim 1, wherein the device housing comprises a sealing gasket configured to isolate the desiccant cartridge and an interior of the device housing from an exterior of the device housing.

11. The scanner of claim 1, wherein the detachable rear bezel comprises an aperture, wherein the aperture provides the data acquisition module line-of-sight access to an exterior of the device housing.

12. The scanner of claim 1, wherein the desiccant cartridge includes a semi-permeable membrane that (i) permits air flow between a desiccant material located within the desiccant cartridge and an interior of the device housing and (ii) prevents the passage of the desiccant material from the desiccant cartridge to the interior of the device housing.

13. The scanner of claim 12, wherein the desiccant material located within the desiccant cartridge is replaceable via factory servicing.

14. The scanner of claim 12, wherein the semi-permeable membrane is a mesh screen.

15. A detachable rear bezel,
the detachable rear bezel configured to be affixed to a device housing,
wherein a desiccant cartridge is removably attached to an interior wall of the detachable rear bezel, and
wherein the desiccant cartridge includes a semi-permeable membrane that (i) permits air flow between a desiccant material located within the desiccant cartridge and an interior of the device housing and (ii) prevents the passage of the desiccant material from the desiccant cartridge to the interior of the device housing,
wherein the desiccant cartridge is shaped to fit within complementary openings in the device housing and in the detachable rear bezel.

16. The detachable rear bezel of claim 15, wherein the detachable real bezel is affixed to the device housing via screws.

17. The detachable rear bezel of claim 15, wherein the desiccant cartridge is removably attached to the interior wall of the detachable rear bezel via a snap-lock connection.

18. A desiccant cartridge, the desiccant cartridge configured to be removably attached to an interior wall of a detachable rear bezel, wherein the desiccant cartridge includes a semi-permeable membrane that (i) permits air flow between a desiccant material located within the desiccant cartridge and an interior of a device housing and (ii) prevents the passage of the desiccant material from the desiccant cartridge to the interior of the device housing;
wherein the detachable rear bezel is configured to be affixed to the device housing and the desiccant cartridge is shaped to fit within a complementary openings in the device housing and in the detachable rear bezel.

* * * * *